Figure 1:
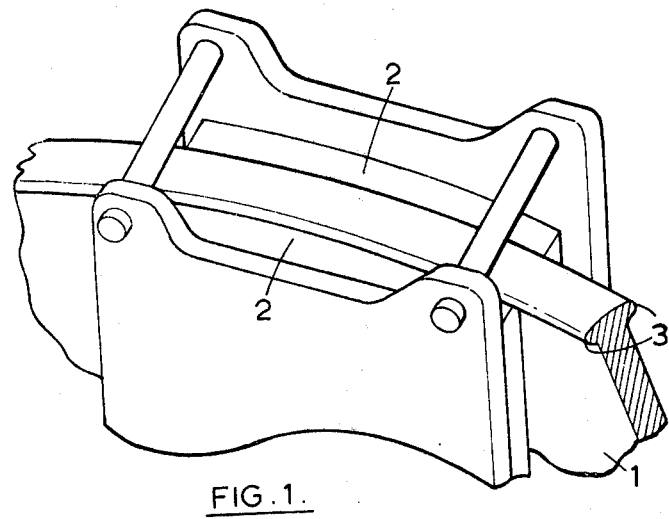

United States Patent [19]
Ford

[11] 3,907,077
[45] Sept. 23, 1975

[54] DISC BRAKES
[75] Inventor: John Charles Ford, Birmingham, England
[73] Assignee: Girling Limited, Birmingham, England
[22] Filed: Feb. 14, 1974
[21] Appl. No.: 442,338

[30] Foreign Application Priority Data
Feb. 17, 1973 United Kingdom............... 7909/73

[52] U.S. Cl............................ 188/218 XL; 188/73.6
[51] Int. Cl.² ........................................ F16D 65/12
[58] Field of Search ........... 188/73.2, 73.6, 218 XL, 188/73.1

[56] References Cited
UNITED STATES PATENTS
3,603,434   9/1971   Leroux........................ 188/218 XL Primary Examiner—George E. A. Halvosa
Attorney, Agent, or Firm—Scrivener Parker Scrivener and Clarke

[57] ABSTRACT

In a disc for a disc brake in which at least one face of the disc is engaged by a friction pad of which the radially outer edge terminates short of the periphery of the disc, a portion of the periphery of the disc is cutaway or chamfered off over a circumferential length at least equal to that of the friction pad in order to prevent the formation of an axially extending lip on the portion of the periphery of the disc as the disc wears.

2 Claims, 4 Drawing Figures

DISC BRAKES

This invention relates to improvements in disc brakes of the kind in which a friction pad is applied to one or each side of a rotatable disc.

Wear of the surface of the disc takes place over the area swept by the pad, the wear being accentuated by corrosion, and as the radially outer edge of the pad does not normally extend to the periphery of the disc the wear produces on the disc an axially extending peripheral lip.

When renewing friction pads the worn pad has to be removed in a radial direction, and the lip on the disc hinders the free removal of the pad. In the usual type of disc brake in which friction pads are applied to opposite faces of the disc by pistons working in opposed hydraulic cylinders in a caliper it may be possible to push the pistons back into the cylinders to provide a clearance for the removal of a pad, but this cannot be done if automatic adjusters are incorporated unless externally accessible means are provided for resetting the adjusters.

According to our invention an arcuate portion of the periphery of a disc for a disc brake is cut away or recessed over a circumferential length at least equal to the maximum width of a friction pad co-operating with the disc, the radial dimension of the cut-away or recessed portion being such that its radially inner edge is of a radius less than that at which the outer edge of the pad is applied.

Thus when a pad has to be replaced the disc is rotated to bring the cut-away or recessed portion of the periphery into radial alignment with the pad which then be slid out radially without difficulty.

In a preferred arrangement two diametrically opposed arcuate portions of the periphery of the disc are cut away so that the disc can be accurately balanced.

As an alternative, portions of the face of the disc at the periphery may be chamfered off over a circumferential length and radial dimensions similar to those of the cut-away portions.

Figure 2:
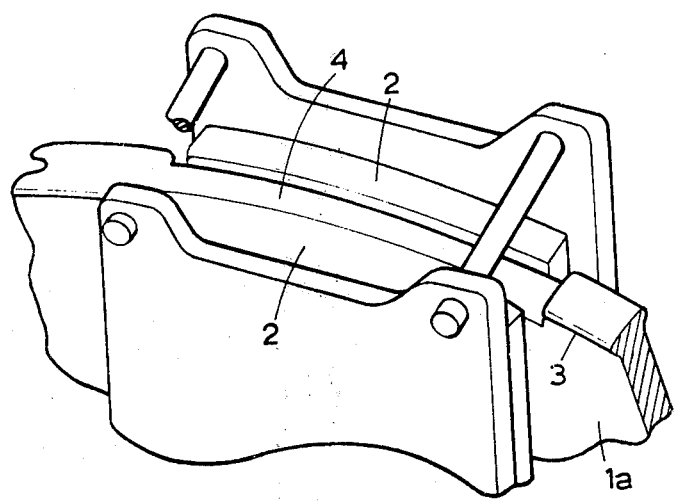
Figure 3:
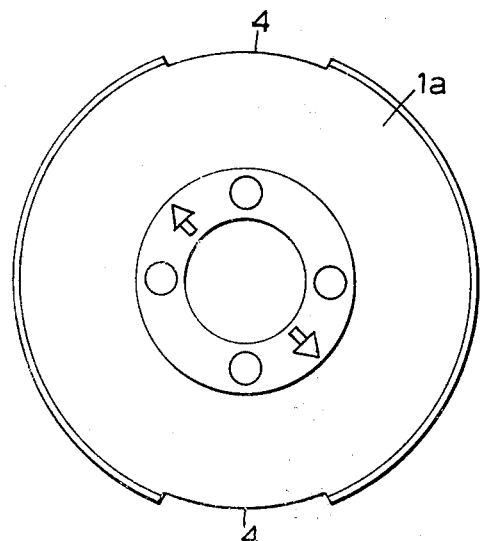
Figure 4:
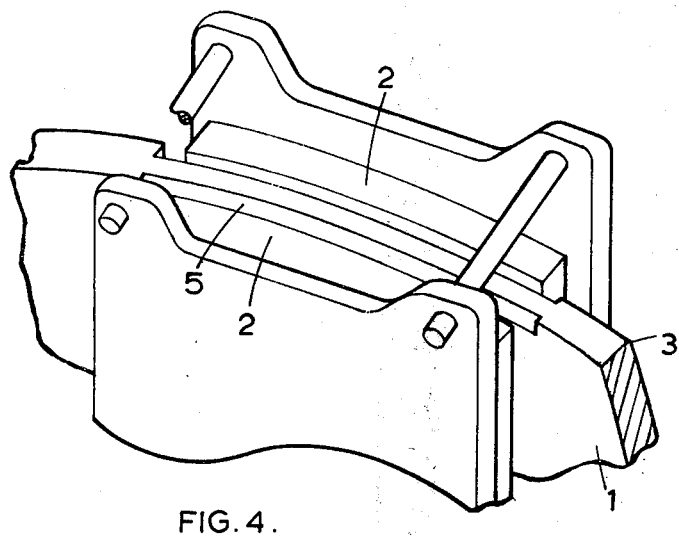

One embodiment of our invention and a modification are illustrated by way of example in the accompanying drawings in which:

FIG. 1 is a fragmentary perspective view of a portion of the periphery of a worn ordinary disc and the associated friction pad, FIG. 2 is a similar view showing the removal of a friction pad from a brake incorporating our improved disc, FIG. 3 is an end elevation of the disc shown in FIG. 2, and FIG. 4 is a fragmentary perspective view of a disc of which the peripheral portion is chamfered off over a limited length.

FIG. 1 shows a brake disc 1 of normal type which is frictionally engaged on opposite sides by brake pads 2, 2 applied to the disc by any convenient hydraulic or other means.

The radially outer edges of the brake pads do not extend to the periphery of the disc, In use the face of the disc wears over the area swept by a pad, and after prolonged use there is left on each side of the disc at its periphery an axially projecting lip 3 which impedes removal of the pads in a radial direction when they have to be replaced.

To overcome this difficulty we cut away a portion of the periphery of the disc to leave a gap as shown at 4 in FIGS. 2 and 3 over a circumferential length equal to or slightly greater than the circumferential length of a brake pad. The radial dimension of the gap is such that it extends inwardly beyond the radially outermost edge of the brake pad so that as the disc wears the lip 3 does not form over the part of the periphery of the disc occupied by the gap, and the brake pad can be removed in a radial direction as shown in FIG. 2.

Usually two diametrically opposed gaps 4 will be formed in the disc as shown in FIG. 3 to allow the disc to be accurately balanced.

As an alternative to forming a gap in the periphery of the disc it may be chamfered off on one or each side as shown at 5 in FIG. 4. As in the case of the gap shown in FIGS. 2 and 3 the circumferential length of the chamfered part of the periphery is equal to or slightly greater than that of a brake pad.

In a disc for use with a brake caliper of the so-called reaction type in which one pad is applied directly by a piston and the other pad is applied by means of a bridge member which passes over the disc, it may only be necessary to have the chamfering on one face of the disc, since the bridge member is usually on slides, so that once one pad has been removed the bridge member can be so positioned as to allow removal of the remaining pad.

The disc may be produced in various ways. Usually the gaps or chamfered portions will be formed by machining but if the disc is a casting they could be formed in the casting operation.

To facilitate pad removal in a brake in which the disc is shrouded by a dust shield and the periphery of the disc cannot be seen a mark may be provided on a visible part of the disc such as the bell for alignment with a mark on an adjacent fixed part of the vehicle to indicate when the gapped or chamfered part of the periphery of the disc is in radial alignment with the brake pad.

I claim:

1. A disc for a disc brake in which at least one face of the disc is engaged by a friction pad of which the radially outer edge does not extend to the peripheral edge of the disc, wherein two diametrically opposed substantially equal portions of the periphery of the disc adjacent said at least one face are cut-away over circumferential lengths each only slightly greater than the circumferential length of said friction pad, the radial dimension of each cut-away portion being at least equal to the radial dimension of the outer part of the disc which is not swept by the pad, and the remainder of the braking surfaces of the disc extending to the full diameter of the disc.

2. A disc for a disc brake as in claim 1 wherein marking is provided to indicate when the cut-away or chamfered portion of the disc is in radial alignment with a friction pad.

* * * * *